United States Patent
Rajasekar et al.

(10) Patent No.: US 9,432,825 B2
(45) Date of Patent: Aug. 30, 2016

(54) SYSTEMS AND METHODS FOR INTEGRATING A SERVICE ACCESS GATEWAY WITH BILLING AND REVENUE MANAGEMENT SYSTEMS

(75) Inventors: Sharath Rajasekar, San Francisco, CA (US); Phelim O'Doherty, San Francisco, CA (US); Boris Selitser, Castro Valley, CA (US); Niklas Modin, Oakland, CA (US); Daniel Jansson, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/006,172

(22) Filed: Jan. 13, 2011

(65) Prior Publication Data
US 2011/0173107 A1   Jul. 14, 2011

Related U.S. Application Data

(60) Provisional application No. 61/294,766, filed on Jan. 13, 2010.

(51) Int. Cl.
*H04W 4/18* (2009.01)
*H04W 4/00* (2009.01)
*G06Q 30/04* (2012.01)

(52) U.S. Cl.
CPC ............... *H04W 4/18* (2013.01); *G06Q 30/04* (2013.01); *H04W 4/00* (2013.01)

(58) Field of Classification Search
None
See application file for complete search history.

(56) References Cited

U.S. PATENT DOCUMENTS

| | | |
|---|---|---|
| 5,799,002 A | 8/1998 | Krishnan |
| 6,055,571 A | 4/2000 | Fulp |
| 6,125,397 A | 9/2000 | Yoshimura |
| 6,222,856 B1 | 4/2001 | Krishnan |
| 6,760,417 B1* | 7/2004 | Wallenius ............... 379/114.28 |
| 6,961,341 B1 | 11/2005 | Krishnan |
| 7,136,913 B2 | 11/2006 | Linderman |
| 7,284,047 B2 | 10/2007 | Barham |
| 7,483,438 B2 | 1/2009 | Serghi et al. |

(Continued)

OTHER PUBLICATIONS

Bea, WebLogic Network Gatekeeper, Architectural Overview, Version 3.0, Sep. 2007, 112 pages.

(Continued)

*Primary Examiner* — Ryan Zeender
*Assistant Examiner* — Denisse Ortiz Roman
(74) *Attorney, Agent, or Firm* — Tucker Ellis LLP (57) ABSTRACT

Systems and methods are described for integrating a gateway in a telecom network environment with charging and payment functionality. The gateway is provided with three points of integration with charging and billing servers. These three points include a payment service, a charging data record listener and a credit control interceptor. The payment service provides an interface for client applications that reside outside of the telecom network to invoke a charging request, to translate the charging request and to relay it to the billing server. The charging data record listener listens for charging data records generated within the gateway and issues offline charging requests to the billing server upon detecting that a particular charging data record has been generated. The credit control interceptor intercepts requests in the communication traffic flowing through the gateway and initiates online charging requests to the billing server upon intercepting said requests.

18 Claims, 7 Drawing Sheets

(56) References Cited

U.S. PATENT DOCUMENTS

| | | |
|---|---|---|
| 8,019,886 B2 | 9/2011 | Harrang |
| 8,296,409 B2 | 10/2012 | Banerjee et al. |
| 8,321,565 B2 | 11/2012 | Bao |
| 8,553,573 B2 | 10/2013 | Sankhavaram |
| 2002/0025795 A1* | 2/2002 | Sharon et al. ............ 455/405 |
| 2003/0028790 A1* | 2/2003 | Bleumer et al. ........... 713/189 |
| 2003/0097461 A1 | 5/2003 | Barham |
| 2004/0009762 A1 | 1/2004 | Bugiu et al. |
| 2004/0193726 A1 | 9/2004 | Gatto |
| 2004/0210522 A1* | 10/2004 | Bissantz et al. ............ 705/40 |
| 2005/0245230 A1 | 11/2005 | Benco et al. |
| 2007/0106801 A1 | 5/2007 | Jansson |
| 2007/0143470 A1* | 6/2007 | Sylvain ..................... 709/224 |
| 2007/0173226 A1* | 7/2007 | Cai et al. .................. 455/405 |
| 2008/0103923 A1* | 5/2008 | Rieck et al. ................ 705/26 |
| 2009/0268715 A1 | 10/2009 | Jansson |
| 2011/0082920 A1 | 4/2011 | Bhattacharya et al. |

OTHER PUBLICATIONS

Chen, et al., Applying SOA and Web 2.0 to Telecom: Legacy and IMS Next-Generation Architecture, IEEE International Conference on e-business Engineering, 2008, 6 pages.

Oracle International Corporation, Oracle Communication Services Gatekeeper Concepts and Architectural Overview, Release 4.1, Jan. 2009, 94 pages.

* cited by examiner

Diameter CDR Listener

SYSTEMS AND METHODS FOR INTEGRATING A SERVICE ACCESS GATEWAY WITH BILLING AND REVENUE MANAGEMENT SYSTEMS

CLAIM OF PRIORITY

The present application claims the benefit of U.S. Provisional Patent Application No. 61/294,766, entitled "GATEKEEPER SERVICE EXPOSURE PLATFORM FOR MOBILE COMMUNICATIONS," by Sharath Rajasekar et al., filed on Jan. 13, 2010, which is incorporated by reference herein in its entirety, including all Appendices filed therewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and gateways for managing access to a wireless network and in particular to integrating service access gateways with charging, payment and credit control systems.

BACKGROUND

With the advent of mobile communications, more and more devices are becoming integrated with the world wide web. Everything from a simple cellular phone to more complex mobile devices such as laptops, electronic books, tablets, personal digital assistants (PDAs) and even automobiles are striving to maintain a constant connection to the internet. As a result of all this interconnectivity, websites and other online application providers have been showing an ever increasing interest in providing services to these mobile clients.

For mobile network operators (MNOs) that own the network and access to the mobile subscriber, onboarding all of these third party service providers and applications has not proved to be easy. A multitude of issues and problems may arise when managing large numbers of applications attempting to access the telecom network. One such issue involves payment, charging, credit/debit actions, as well as other billing and revenue management functions.

In many cases, providing centralized management and integration of all these charging and billing functions can be a quite complex and tedious task for a network operator, especially when it involves large numbers of applications. By way of example, some applications may wish to integrate their charging into the monthly bill of a subscriber, while others may be based on prepaid services, requiring credit control actions on the fly. Moreover, in some cases, the charging and payment functions can be invoked for actions initiated by a mobile subscriber, while in other cases, the charging action may originate with the application providing the service to the subscriber. What is needed is a way to integrate all of these potential use cases and to provide centralized management and control over the payment, charging and other revenue management in a telecom network environment.

BRIEF SUMMARY OF THE INVENTION

Systems and methods are described for integrating a gateway in a telecom network environment with charging and payment functionality. The gateway is provided with three points of integration with charging and billing servers. These three points include a payment service, a charging data record listener and a credit control interceptor. The payment service provides an interface for client applications that reside outside of the telecom network to invoke a charging request, to translate the charging request and to relay it to the billing server. The charging data record listener listens for charging data records generated within the gateway and issues offline charging requests to the billing server upon detecting that a particular charging data record has been generated. The credit control interceptor intercepts requests in the communication traffic flowing through the gateway and initiates online charging requests to the billing server upon intercepting said requests.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments of the invention, a service exposure gatekeeper platform is integrated with charging, payment, billing and revenue management systems. In accordance with an embodiment, the gatekeeper platform is a service access gateway that is positioned to manage access to a wireless telecommunications (telecom) network (e.g. cellular telephone network, such as GSM or CDMA network). The gatekeeper can intercept and manage communications between the mobile devices in the wireless network and the various third party service providers, such as client web applications residing on the Internet. For example, the gatekeeper can intercept both network-initiated communications and application-initiated communications and apply service level agreements (SLAs), security, traffic throttling, protocol translation and other functionality to those communications. In accordance with one embodiment, the gatekeeper is implemented as a web application that is deployed by a network operator.

In accordance with an embodiment, the gatekeeper allows the gathering of billing information to charge the various clients accessing the network and the integration with various billing and revenue management (BRM) systems. In accordance with an embodiment, there are three points of integration of the gatekeeper with the BRM systems—(1) a payment communications service; (2) a Diameter protocol charging data record (CDR) listener; and (3) a Diameter protocol credit control interceptor. As described in further detail below, all of these points of integration allow the gatekeeper to activate charging and payment services in response a request received from a client application or in response to traffic flowing through the telecom network.

Figure 1:
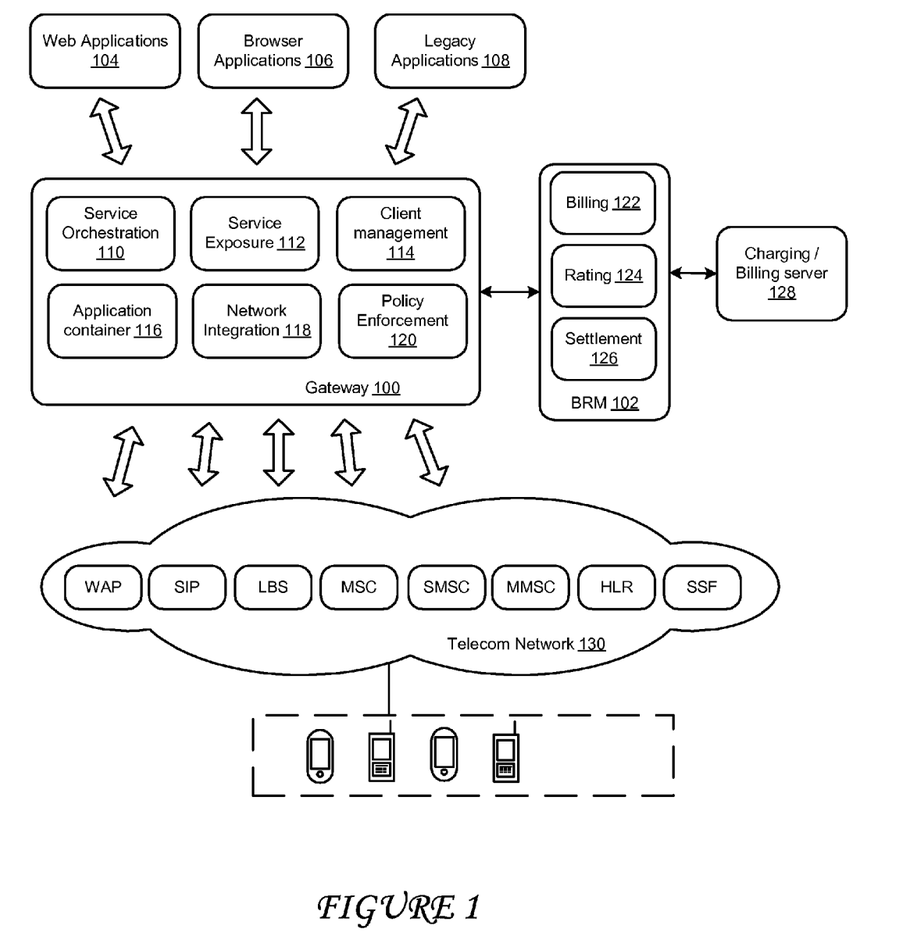
FIG. 1 is an illustration of a gatekeeper platform, in accordance with various embodiments of the invention.

FIG. 1 is an illustration of a gatekeeper platform, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the gatekeeper can take the role of a gateway 100 positioned between the telecom network 130 and a multitude of different service provider applications 104, 106, 108 residing externally with respect to the telecom network. The gateway can play an intermediary role between the request traffic sent from the applications to the resource in the telecom network and requests sent from the network to the applications. In accordance with various embodiments, the gateway can be used to apply a number functions to this request traffic, including but not limited to service orchestration 110, service exposure 112, policy enforcement 120 and network integration 118. By way of example, the service orchestration 110 functionality of the gateway can be used to orchestrate multiple services provided by the various applications in a single call that is established for a mobile subscriber in the telecom network. The service exposure 112 functionality can expose a number of low level native protocols of the telecom network as a simple web services accessible by the applications over hypertext transfer protocol (HTTP)/simple object access protocol (SOAP). The policy enforcement 120 engine can enforce a set of rules and policies according to service level agreements (SLAs) established between the network operator and its clients. In addition, the gateway can include a number of other features, such as client management 114, and an application container 116 for hosting applications.

In accordance with an embodiment, the gateway 100 can be integrated with billing and revenue management (BRM) systems 102 and remote charging servers 128. The BRM system is a set of software tools deployed in an enterprise to manage the billing 122, rating 124 and settlement 126 of various monetary policies of the enterprise. It can interact with any number of back-end account/balance systems 128 that maintain financial information. In accordance with various embodiments, the gateway 100 is integrated with such BRM and other account management systems by employing a payment service, a charging data record (CDR) listener and a credit control interceptor.

Payment Service

In accordance with an embodiment, the first point of integration is the payment communication service. The payment service can provide an interface for client applications to invoke charge or refund requests on a remote billing or charging server. In accordance with an embodiment, the payment service supports the ParlayX protocol "Amount Charging" functions (e.g. Charge Amount, Refund Amount, Charge Split Amount) and also supports the ParlayX "Reserve Amount Charging" functions (Reserve Amount, Reserve Additional Amount, Charge Reservation, Release Reservation). Parlay X is a set of Web Services application programming interfaces (APIs) defined jointly by the European Communications Standards Institute (ETSI), the Parlay Group, and the Third Generation Partnership Program (3GPP). For reference purposes, the Parlay X version 3.0 Specification is incorporated by reference herein. However, it is noted that many embodiments contained in this disclosure are not limited to the Parlay X specification(s) and that other protocols or APIs can be easily utilized within the scope of the various embodiments.

The payment interfaces can be provided in the "north" application facing interface, i.e. the interface between the gateway and the client applications residing outside of the telecom network that wish to provide services to subscribers within the telecom network. In the "south" facing (i.e. telecom network-facing) interface, this payment communication service can support the Diameter online charging (Ro) protocol. The Diameter protocol is an authentication, authorization and accounting protocol for computer networks. More specifically, Diameter protocol is specified by the Request for Comments Memorandum (RFC) 3588 and 4006, published by the Internet Engineering Task Force (IETF) which are hereby incorporated by reference herein in their entireties. It is noted, however, that the Diameter protocol is also not limiting to all of the embodiments contained in this disclosure.

Figure 2:
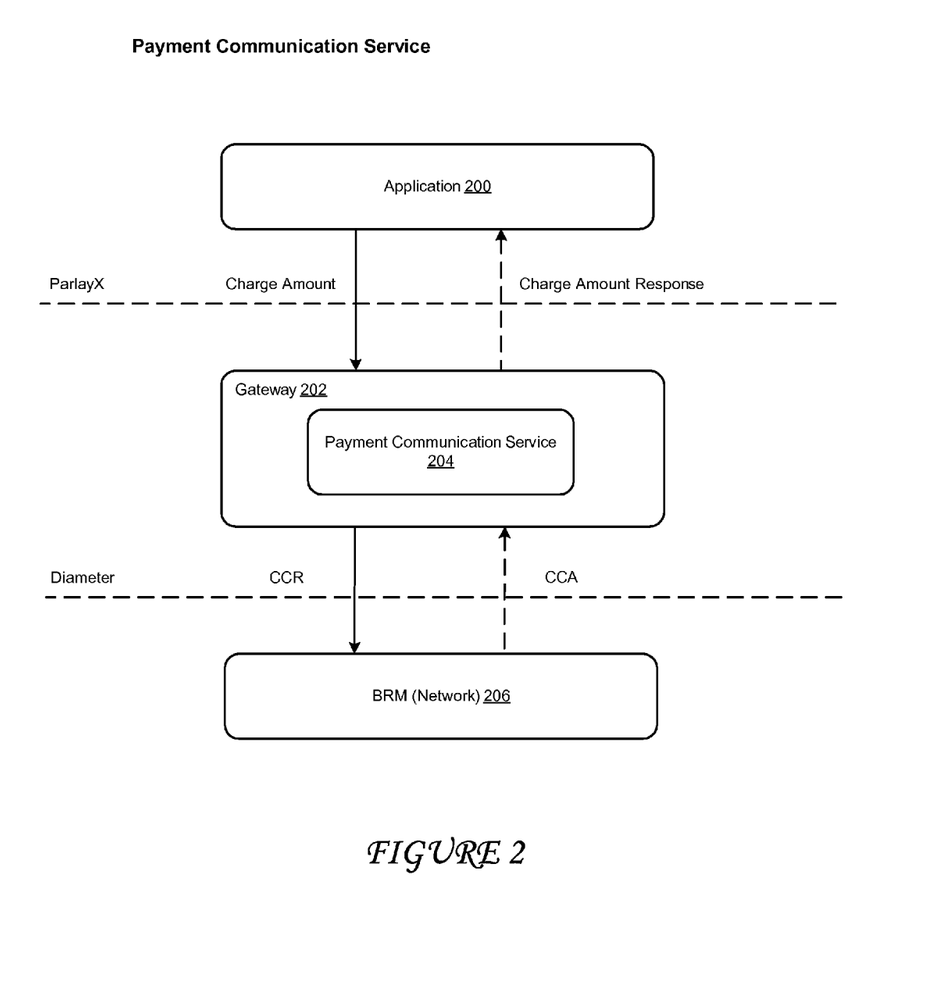
FIG. 2 is an illustration of the payment communication service, in accordance with various embodiments of the invention.

FIG. 2 is an illustration of the payment communication service, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the application 200 can invoke charge amount request to the payment communication service 204 residing on the gateway 202. In accordance with an embodiment, the gateway 202 then issues a credit control request (CCR) to the BRM 206 via the Diameter Ro protocol on the network. Once a credit control answer (CCA) is received back from the network, the payment communication service 204 can issue a charge amount response back to the application. As illustrated, the communication between the application and the gatekeeper can be performed via the Parlay X APIs, while the communication between the gatekeeper and the network can be done over the Diameter protocol.

In accordance with various embodiments, there can be many use cases for the payment service. By way of example, one possible use case occurs during service delivery. A subscriber in the telecom network may order a service from a service provider. For example, a user can order a picture pack from Disney by sending a short messaging service (SMS) message. The client application can then reserve funds for service by using the payment communication service residing on the gateway. For example, the Disney application can reserve a particular dollar amount using the payment interface which is the price for the picture pack. BRM can in turn approve the reservation. The application can then deliver the service to the end-user (Disney uses the MMS service to deliver the one time picture pack). The application then commits the reservation. In addition, the Disney application can commit the reserved amount after a delivery notification has been received indicating that the picture pack has been delivered.

It should be noted that the above example (as well as all example use cases described herein) is only provided for purposes of illustration and is not intended to limit the payment communication service functionality, nor other embodiments described herein. Various other use cases exist for this service in addition to the one described above.

Figure 3:
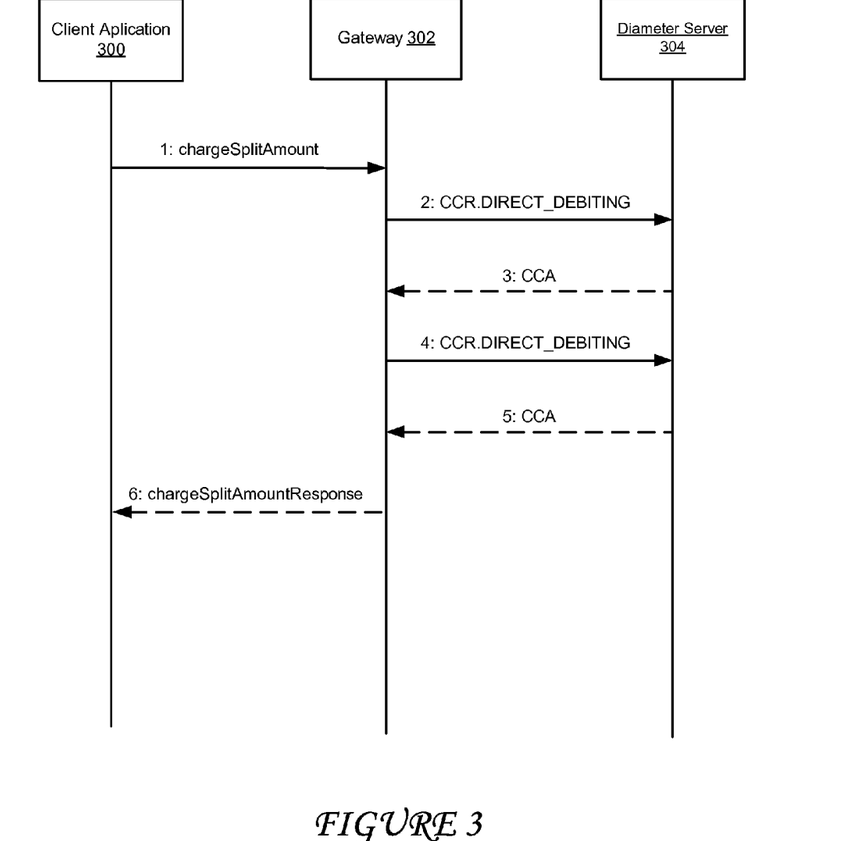
FIG. 3 is a flow chart illustration of the payment service used to invoke a charge split amount request, in accordance with various embodiments of the invention.

FIG. 3 is a flow chart illustration of the payment service used to invoke a charge split amount request, in accordance with various embodiments of the invention. As illustrated, a client application 300 issues a "chargeSplitAmount" request to the gateway 302. As the name indicates, the charge split amount function can split a single charge between multiple accounts or multiple servers. For example, if a sponsor code was entered that would pay for a portion of the amount, the gateway can invoke a charge split amount request to the server.

Continuing with the illustration, once the gateway receives the request from the application, it can issue a credit control request (CCR) direct debit function to the server 304 over the Diameter Ro protocol. When it receives a credit control answer (CCA), the gateway can issue one or more additional direct debit requests to the server to split the charge amount. After all of these functions have been performed, the gateway returns a "chargeSplitAmountResponse" to the client application, indicating whether the charges were successfully performed.

Charging Data Record (CDR) Listener

In accordance with various embodiments, the gateway can continuously generate charging data records (CDRs) as it continues to process incoming requests from the applications and resources in the telecom network. A CDR can contain a variety of information for each processed request, such as which method was invoked, what response was received, and so on. In accordance with an embodiment, a listener can be registered to listen to the various CDRs as they are being generated and to perform a particular function once a specified CDR or a set of CDRs are issued by the gateway.

In accordance with an embodiment, the CDR listener is used to convert the CDRs that the gateway generates into Diameter offline charging (Rf) charging requests, allowing the gateway to be integrated with charging systems that support the Diameter Rf offline charging. This can be useful for any billing, charging and reporting functionality related to traffic passing through the gateway.

In accordance with an embodiment, when traffic is sent through the gateway, CDRs are created. A CDR-to-Diameter module can be deployed and act as a singleton service Java Messaging Service (JMS) Listener. This listener can be managed by an MBean in the gateway. When a CDR is created that contains a particular value pair and start/stop value, the listener can create a Diameter START (or STOP) Account request (ACR). In accordance with an embodiment, the Diameter attribute value pairs (AVPs) that exist in this ACR depend on the values contained in the CDR that the gateway generated.

Figure 4:
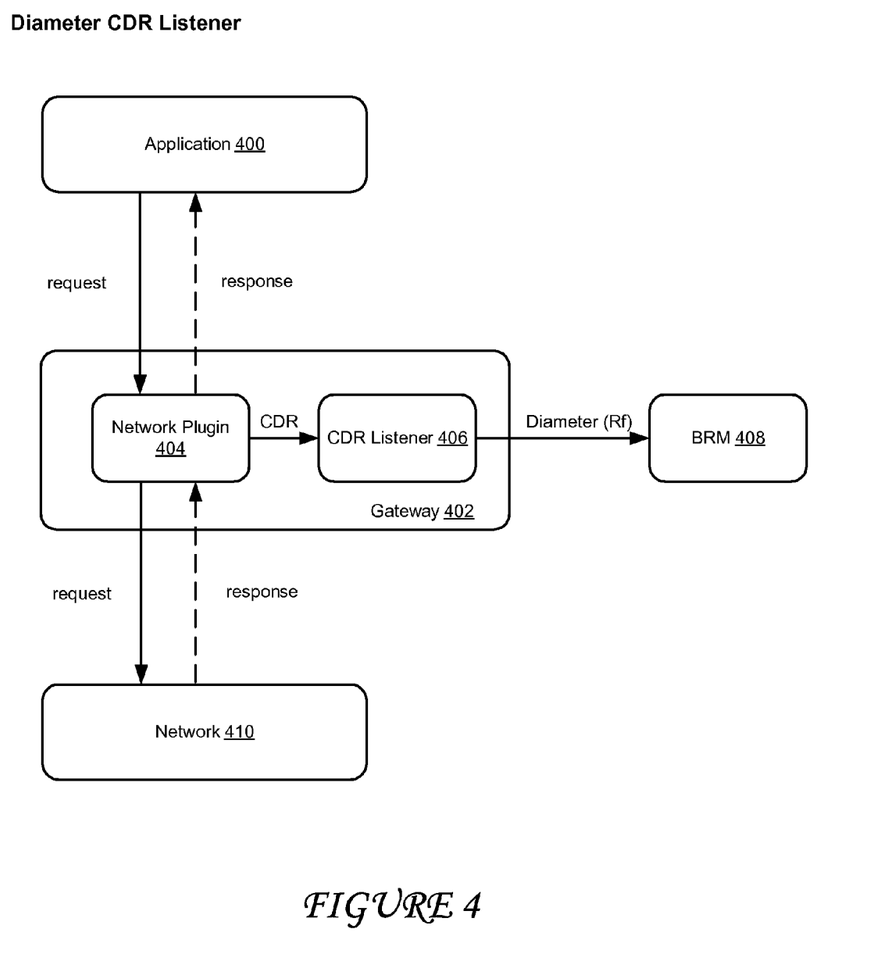
FIG. 4 is an illustration of the charging data record (CDR) listener, in accordance with various embodiments of the invention.

FIG. 4 is an illustration of the charging data record (CDR) listener, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the CDR listener 406 is deployed on the gateway 402 and communicates with BRM systems 408 by way of the Diameter Rf protocol. When the gateway intercepts various requests from the application 400 or responses from the telecom network 410 directed back to the application, the gatekeeper 402 can generate charging data records. This can be generated by the network plugin 404, or some other component of the gateway. The CDR listener 406 can subscribe to listen for particular records and when the network plug-in 404 issues a record having been subscribed by the listener, it can invoke the Diameter Rf function to contact the BRM system 408.

There are many use cases for the CDR listener, but one illustration of a potential use case can be as follows: end users subscribe to Disney's new multimedia messaging service (MMS) service. End users subscribe to Disney's service on the Hannah Montana web page and by sending a register via SMS. Disney can then send out a particular number of messages (e.g. 4000 MMS messages) per day. By doing this, 4000 CDRs can be generated per day. These CDR's are then translated to Diameter calls, as illustrated in the figure. The batch sizes etc. allows for more control on how to handle collecting of CDRs and Diameter traffic. In this example, the bill may be sent out at the end of the month, where BRM sends a bill to Disney for all the thousands of MMS messages being sent out to subscriber end-users.

Credit Control Interceptor

In accordance with various embodiments, the gateway can include a sequence of interceptors that can be applied to the communication traffic being sent through the gateway. In accordance with an embodiment, an interceptor is an object that can be registered to filter the requests coming from the network or from the application and perform a particular functionality in response to receiving a specified request. For example, one interceptor may change the parameters in certain types of requests in order to translate between different protocols, while another interceptor may invoke perform some other service. In accordance with an embodiment, multiple interceptors can be applied to each request in a sequence, where if the filter of the interceptor matches the parameters of the request, the interceptor can be invoked, otherwise if the filter does not match the request, the interceptor can be skipped. In this manner, the gateway can apply specific custom functionality to the communication traffic flowing to and from the telecom network.

In accordance with an embodiment, a third point of integration between the gateway and various billing/charging/payment systems can be a credit control interceptor (CCI). The CCI can give a network operator of the telecom network a possibility to perform pre-paid credit control and charging operations on arbitrary traffic sent through the gateway. In accordance with an embodiment, the parameters used to execute the credit control and charging operations can either be taken from the traffic being sent by the application or by a set of statistics provided by the operator. These parameters can be defined based on a service type or method executed by the client application and the service provider running the application. In accordance with an embodiment, the operator can also define when a reservation of funds is to be made, and at what point this reservation should be committed, if successfully reserved. This means that the operator can choose to reserve the amount when a "north facing" operation is executed and commit the reservation asynchronously at a later point based on traffic coming from the network, such as a message delivery report. In accordance with an embodiment, the credit control is performed by an external billing system using the Diameter protocol.

Figure 5:
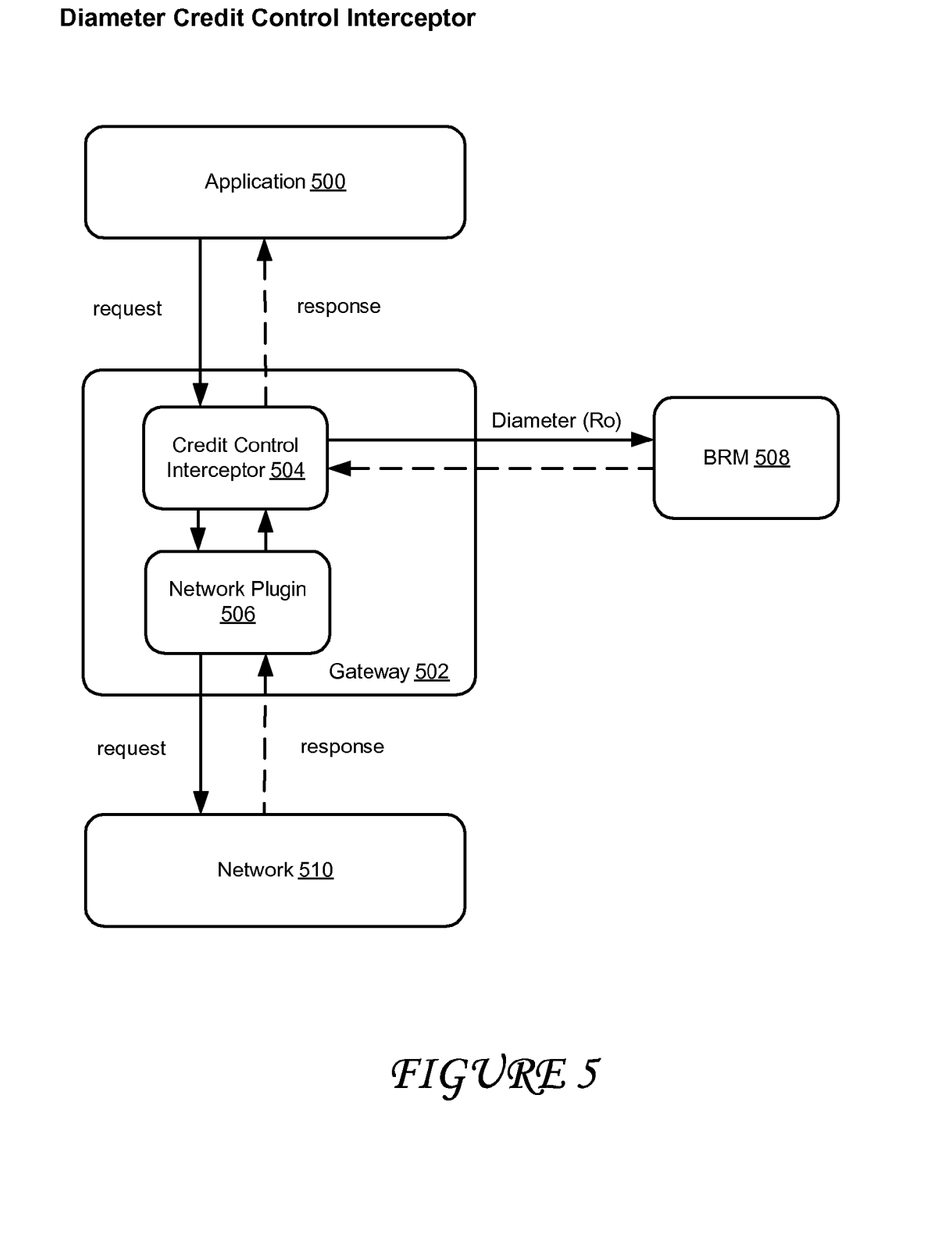
FIG. 5 illustrates a credit control interceptor in accordance with various embodiments of the invention.
Figure 6:
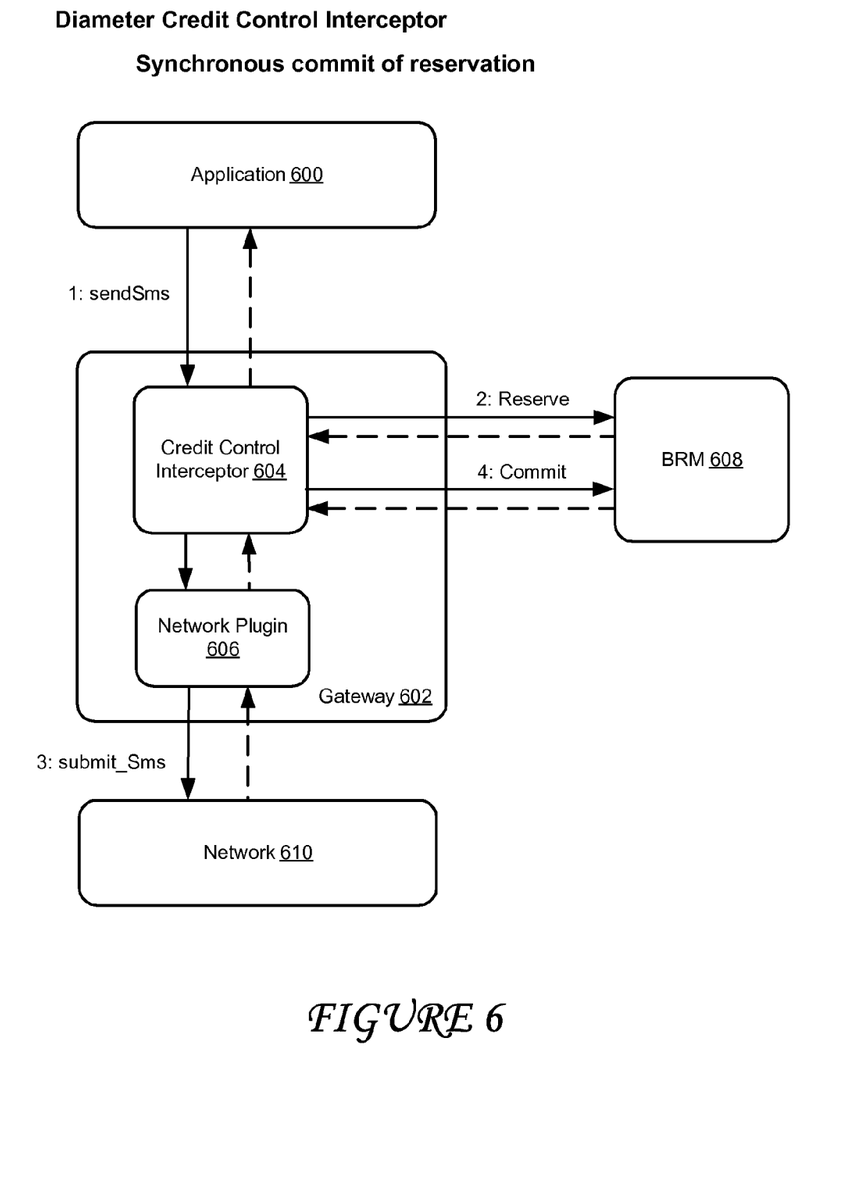
FIG. 6 illustrates synchronous commit of reservation by the credit control interceptor, in accordance with various embodiments of the invention.
Figure 7:
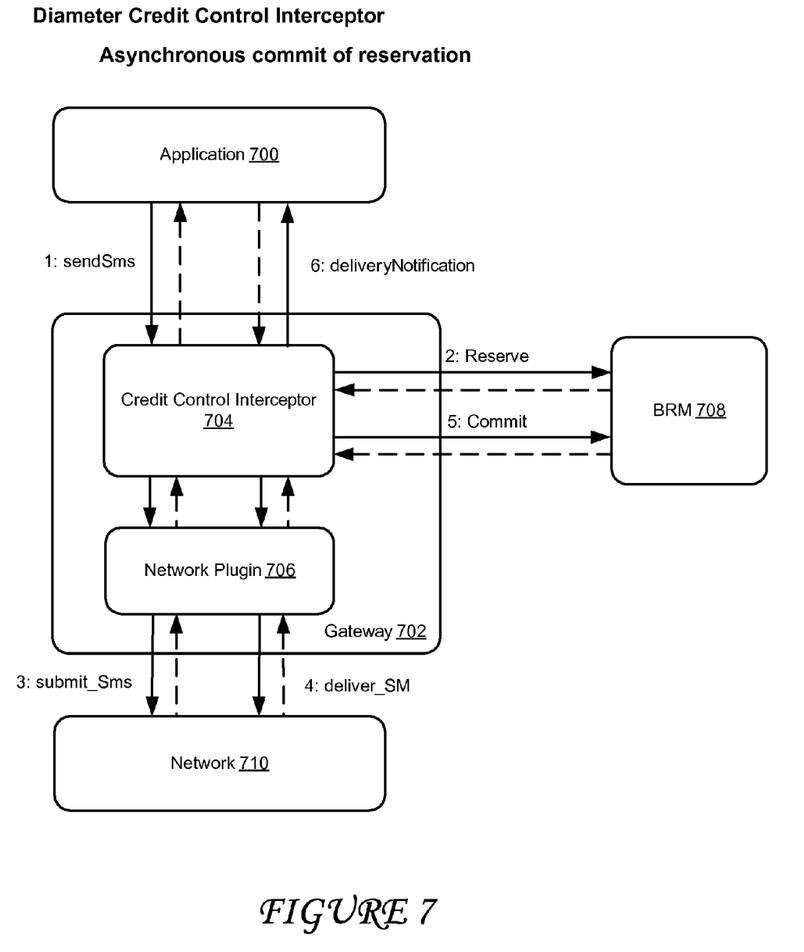
FIG. 7 illustrates asynchronous commit of reservation by the credit control interceptor, in accordance with various embodiments of the invention.

FIGS. 5-7 are illustrations of the credit control interceptor, in accordance with various embodiments of the invention. Although these diagrams depict components as logically separate, such depiction is merely for illustrative purposes. It will be apparent to those skilled in the art that the components portrayed in these figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

FIG. 5 illustrates a credit control interceptor in accordance with various embodiments of the invention. As illustrated in FIG. 5, the gateway 502 includes a credit control (CC) interceptor 504 that can intercept requests received from the application 500 and responses received from the Network Plugin 506 to the telecom network 510. In turn, the CC interceptor 504 can issue Diameter Ro protocol calls to the BRM system 508. This interception and issuing can include either a synchronous commit of reservation or an asynchronous commit of reservation.

FIG. 6 illustrates synchronous commit of reservation by the credit control interceptor, in accordance with various embodiments of the invention. As illustrated in FIG. 6, an application 600 may first issue a send SMS message to the gateway 602. The credit control interceptor 604 can then reserve the amount with the BRM system 608. Once the message has been submitted to the telecom network 610 by way of a Network Plugin 606, the CC interceptor can then commit the charge with the BRM system 608.

FIG. 7 illustrates asynchronous commit of reservation by the credit control interceptor, in accordance with various embodiments of the invention. As shown in FIG. 7, during an asynchronous commit, an application 700 first issues an SMS message and the CC interceptor 704 then reserves the amount with the BRM system 708. The gateway 702 can then forward the message to the telecom network 710 by way of a network plugin 706. Once the deliver message confirmation has been received from the network, the CC interceptor 704 can then commit the reservation at the BRM system 708 and also transmit a delivery notification to the application 700.

One potential use case of the credit control interceptor can be as follows: End user can register for a service subscription. For example, a user may subscribe to the Hannah Montana picture of the week by sending an SMS message to Disney's short code. At this point, a pre-paid check is made. Disney can then send an MMS message to the user which is intercepted by the CC interceptor. A credit control check is made using the recipient address as payee and a reservation is made for the amount specified in the custom SLA. MMS is then delivered to subscriber by sending the weekly picture MMS the user. At this point, funds are withdrawn and upon receiving the delivery notification, the interceptor commits the reservation towards BRM, and funds are withdrawn from the user's account.

Further details and information on the payment service, charging data records listener and credit control interceptor, as well as other functionality described throughout this disclosure can be found in the U.S. Provisional Patent Application No. 61/294,766, which is incorporated herein by reference in its entirety, including all of the Appendices filed therewith.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for integrating a gateway in a telecommunication (telecom) network environment with charging and payment functionality, said system comprising:
    a gateway residing in said telecom network operating on one or more microprocessors, wherein the gateway intercepts communication traffic transmitted between mobile devices connected to the telecom network and one or more client applications that reside externally with respect to said telecom network;
    a charging data record listener, executing on said gateway, wherein the charging data record listener listens for charging data records generated within the gateway as the gateway processes the communication traffic, wherein each charging data record contains one or more methods invoked, and one or more responses received for each request in the communication traffic, and wherein the charging data record listener converts a charging data record into an offline charging request and issues the offline charging request over a diameter protocol to a billing server that supports the diameter protocol, upon detecting that the charging data record has been generated;
    a payment service executing on the gateway, said payment service providing an interface for said client applications to invoke a charging request, wherein the payment service translates said charging request and transmits the translated charging request to the billing server; and
    a credit control interceptor executing on said gateway, wherein the credit control interceptor is an object registered with said gateway that filters requests in said communication traffic, wherein if a request matches parameters set in the credit control interceptor, the credit control interceptor is invoked and initiates an online charging request and a credit control request to the billing server.

2. The system of claim 1, wherein the payment service includes an application-facing interface that exposes Parlay X functions to perform one or more of the following: charge an amount, to refund an amount, charge split amount, reserve an amount, reserve an additional amount, charge reservation or release reservation; and wherein the payment service includes a network-facing interface that communicates the request to the billing server over a Diameter online charging (Rf) protocol.

3. The system of claim 1, wherein the charging data record listener inspects a set of values in a charging data record generated by the gateway and creates a request to the billing server, said request to the billing server including attribute value pairs that depend on the values in the charging data record.

4. The system of claim 1, wherein the credit control interceptor functions in a synchronous mode for committing reservations, wherein the credit control interceptor receives a request from the client applications, reserves an amount with the billing server, submits the request to the telecom network and commits the amount with the billing server after having transmitted the request to the telecom network.

5. The system of claim 1, wherein the credit control interceptor functions in an asynchronous mode for committing reservations, wherein the credit control interceptor receives a request from the client applications, reserves an amount with the billing server, submits the request to the telecom network, receives a delivery confirmation from the telecom network and commits the amount with the billing server after having received the delivery confirmation.

6. The system of claim 1, wherein the credit control interceptor is configured using a service level agreement (SLA) to determine which requests should initiate the online charging request to the billing server.

7. The system of claim 1, wherein the credit control interceptor is managed at runtime using an MBean in a console of said gateway.

8. The system of claim 1, wherein the payment service is configured to invoke a charge split amount request, which splits a single charge between multiple accounts.

9. A method for integrating charging and payment functionality in a telecommunication (telecom) network environment operating on one or more microprocessors, said method comprising:
    intercepting within a gateway residing in said telecom network communication traffic transmitted between mobile devices connected to the telecom network and one or more client applications that reside externally with respect to said telecom network;
    generating, via the gateway, charging data records upon intercepting said communication traffic as the gateway processes the communication traffic, wherein each charging data record contains one or more methods invoked, and one or more responses received for each request in the communication traffic;
    registering a charging data record listener executing on said gateway to listen for the charging data records generated within the gateway, wherein the charging data record listener converts a charging data record into an offline charging request and issues the offline charging request over a diameter protocol to a billing server that supports the diameter protocol, upon detecting that the charging data record has been generated;
    a payment service executing on the gateway, said payment service providing an interface for said client applications to invoke a charging request, wherein the payment service translates said charging request and transmits the translated charging request to the billing server; and
    providing a credit control interceptor that is an object registered with said gateway that filters requests in said communication traffic, wherein if a request matches Parameters set in the credit control interceptor, the credit control interceptor is invoked and initiates an online charging request and a credit control request to the billing server.

10. The method of claim 9, wherein the payment service includes an application-facing interface that exposes Parlay X functions to perform one or more of the following: charge an amount, to refund an amount, charge split amount, reserve an amount, reserve an additional amount, charge reservation or release reservation; and
    wherein the payment service includes a network-facing interface that communicates the request to the billing server over a Diameter online charging (Rf) protocol.

11. The method of claim 9, wherein the charging data record listener inspects a set of values in a charging data record and creates a request to the billing server, said request to the billing server including attribute value pairs that depend on the values in the charging data record.

12. The method of claim 9, wherein the credit control interceptor functions in a synchronous mode for committing reservations, wherein the credit control interceptor receives a request from the client applications, reserves an amount with the billing server, submits the request to the telecom network and commits the amount with the billing server after having transmitted the request to the telecom network.

13. The method of claim 9, wherein the credit control interceptor functions in an asynchronous mode for committing reservations, wherein the credit control interceptor receives a request from the client applications, reserves an amount with the billing server, submits the request to the telecom network, receives a delivery confirmation from the telecom network and commits the amount with the billing server after having received the delivery confirmation.

14. The method of claim 9, wherein the credit control interceptor is configured using a service level agreement (SLA) to determine which requests should initiate the online charging request to the billing server.

15. The method of claim 9, wherein the credit control interceptor is managed at runtime using an MBean in a console rendered to a user.

16. The method of claim 9, wherein the payment service is configured to invoke a charge split amount request, which splits a single charge between multiple accounts.

17. A nontransitory computer readable storage medium storing a set of instructions, said instructions executed by one or more processors, causing the one or more processors to perform the steps comprising:

intercepting within a gateway residing in said telecom network communication traffic transmitted between mobile devices connected to the telecom network and one or more client applications that reside externally with respect to said telecom network;

generating, via the gateway, charging data records upon intercepting said communication traffic as the gateway processes the communication traffic, wherein each charging data record contains one or more methods invoked, and one or more responses received for each request in the communication traffic;

registering a charging data record listener executing on said gateway to listen for the charging data records generated within the gateway, wherein the charging data record listener converts a charging data record into an offline charging request and issues the offline charging request over a diameter protocol to a billing server that supports the diameter protocol, upon detecting that the charging data record has been generated;

providing a payment service executing on the gateway, said payment service providing an interface for said client applications to invoke a charging request, wherein the payment service translates said charging request and transmits the translated charging request to the billing server; and providing a credit control interceptor that is an object registered with said gateway that filters requests in said communication traffic, wherein if a request matches parameters set in the credit control interceptor, the credit control interceptor is invoked and initiates an online charging request and a credit control request to the billing server.

18. The nontransitory computer readable storage medium of claim 17, wherein the payment service is configured to invoke a charge split amount request, which splits a single charge between multiple accounts.

\* \* \* \* \*